United States Patent Office 3,437,179
Patented Apr. 8, 1969

3,437,179
HYDRAULIC BRAKE SYSTEM AND CONTROL MEANS THEREFOR
Pierre Andre Georges Lepelletier, Chatou, France, assignor to Societe Anonyme Francaise du Ferodo, Paris, France, a corporation of France
Filed June 1, 1967, Ser. No. 642,791
Claims priority, application France, June 9, 1966, 64,835
Int. Cl. B60t 11/10, 13/00; F15b 7/00
U.S. Cl. 188—152                            4 Claims

ABSTRACT OF THE DISCLOSURE

The invention relates to a hydraulic brake system in which each brake of a first wheel axle has a hydraulic actuating chamber and a hydraulic reaction chamber, and each brake of a second axle has a hydraulic actuating chamber. A master-cylinder and a master-piston supplies fluid under pressure to three independent conduits, the two brake reaction chambers of said first axle having a pressure produced by the braking torque of the corresponding wheel and being connected together and to a fourth conduit connected to the master-cylinder through an automatic reversing device mounted movably between a forward-running position in which the fourth conduit is connected to the third conduit, and a reversing position in which said fourth conduit is connected to a tank. The reversing device is comprised of a single plunger actuated in one direction by a spring and the pressure in the third conduit, and in the other direction by the sum of the pressures in the first and second conduits.

---

The present invention relates to a hydraulic brake installation, especially for automobile vehicles, in which each of the brakes of a first axle, for example the front axle, has a hydraulic actuating chamber and a hydraulic reaction chamber, while each of the brakes of a second axle, for example the rear axle, has a hydraulic actuating chamber, a master-cylinder having a master-piston which drives in a partitioned manner three volumes of oil respectively into three independent conduits: a first and a second conduit respectively coupled to the two actuating chambers of the brakes of the first axle and a third conduit coupled to the actuating chambers of the brakes of the second axle, the reaction chambers of the brakes of the first axle each having its pressure which, during the course of braking, results from the reaction of the braking torque applied to the corresponding wheel, and which is higher on forward running than on reverse running, the said reaction chambers being connected to each other and to a fourth conduit coupled to the master-cylinder through the intermediary of automatic reversing means mounted movably between two positions, a forward-running position in which the fourth conduit communicates with the third conduit, and a reverse-running position, in which the fourth conduit communicates with a tank.

Installations of this type have already been proposed, in which the reversing means comprise two independent plungers adapted to cause equal pressures in the first two conduits under certain circumstances of operation, for example during the course of braking on reverse running, or in the event of bursting of the fourth conduit.

However, these installations lead to errors of operation when, during the course of braking on forward running, the pressure in one of the first two conduits becomes preponderant, for example in consequence of bad adhesion on the ground of one of the sides of the road. In this case, the fourth conduit is inopportunely put into communication with the tank and the braking on forward running is adversely affected.

The invention has for its object an installation of the type indicated above which is free from this disadvantage and which is especially characterized in that the said automatic reversing means comprise a single plunger member which is subjected in one direction to the action of a spring and to the action of the pressure existing in the third conduit, and which is subjected in the other direction to the sum of the actions of the pressures existing respectively in the first and second conduits.

By virtue of this arrangement, any untimely communication of the fourth conduit with the tank is prevented during the course of braking on forward running.

One form of embodiment of the invention is described below by way of example, reference being made to the accompanying drawings, in which.

Figure 1:
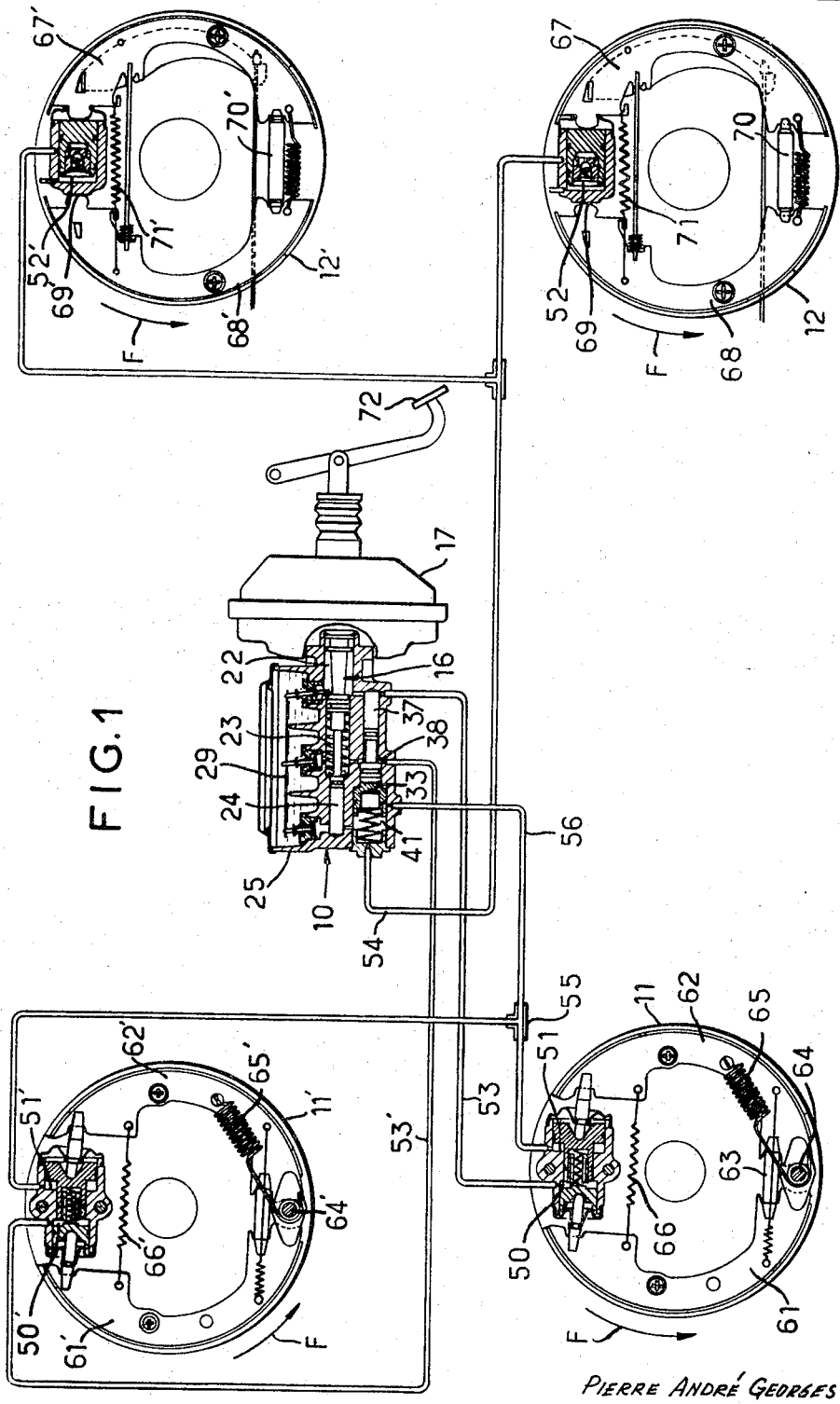
FIG. 1 is a diagram of an installation of hydraulic brakes in accordance with the invention.
Figure 2:
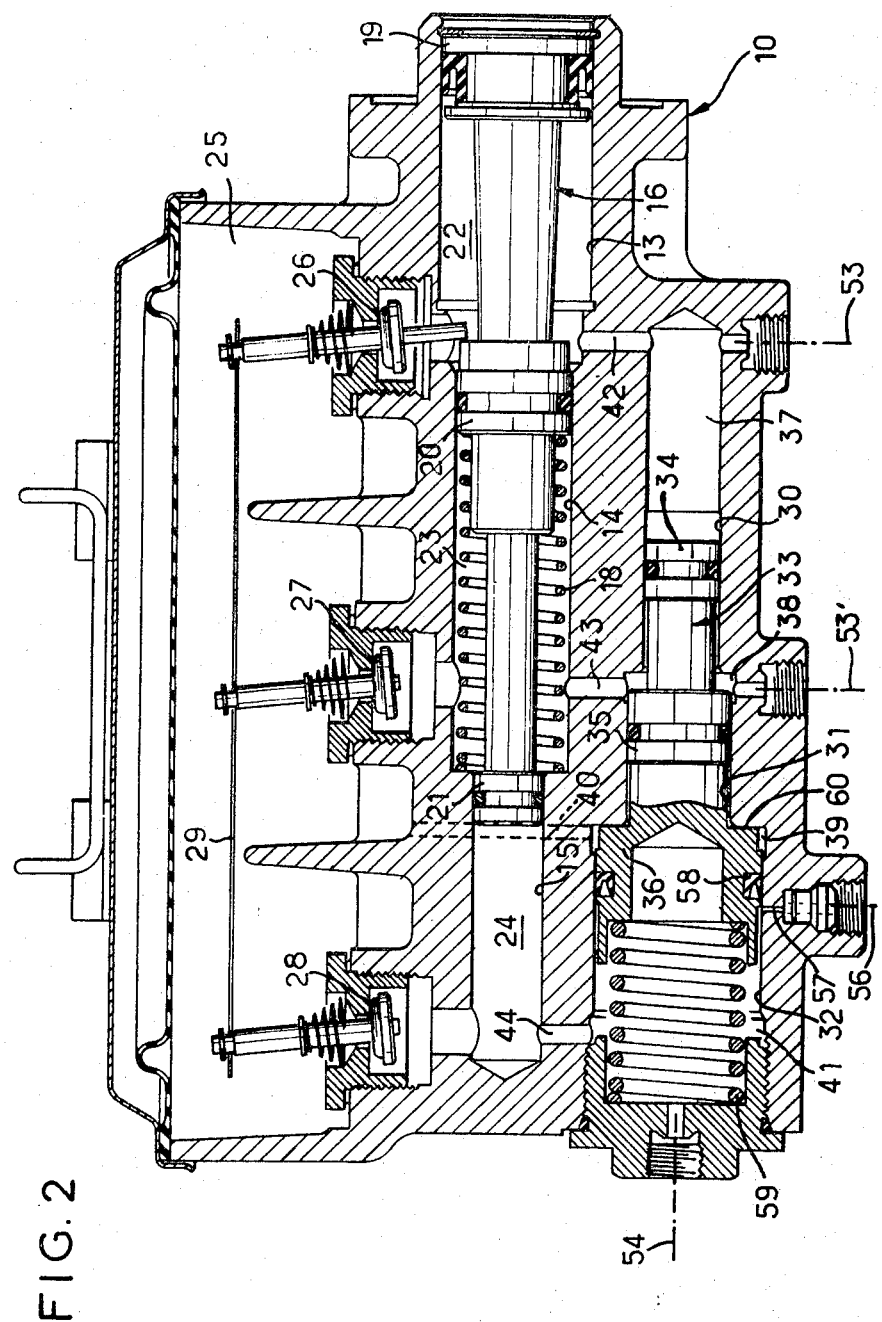
FIG. 2 is a view in longitudinal section of the master-cylinder of this installation.

In the form of construction shown in FIGS. 1 and 2, which relate by way of example to an application of the invention to a braking installation for automobile vehicles, there can be seen at 10 the master-cylinder, at 11 and 11' the brakes of the first axle, for example the front brakes, and at 12 and 12', the brakes of a second axle, for example the rear brakes.

As shown in FIG. 2, the master-cylinder 10 comprises three stepped bores 13, 14 and 15, receiving a master-piston 16. This piston is actuated from a brake pedal 72, for example through the intermediary of a servo-brake 17, and is returned to rest by a restoring spring 18.

The master-piston 16 comprises three pistons 19, 20 and 21 of decreasing diameters, respectively engaged in the bores 13, 14 and 15. Between the pistons 19 and 20 is arranged a first primary thrust chamber 22. Between the pistons 20 and 21 is formed a second primary thrust chamber 23. At the front of the piston 21 is formed a secondary thrust chamber 24.

The chambers 22, 23 and 24 are connected to a tank 25 through the intermediary of valves 26, 27 and 28, which are conjointly operated by a rod 29 and which are adapted to tilt in response to the displacements of the master-piston 16, through the intermediary of the tail of the valve 26. Each of the valves 26, 27 and 28 is half open when the master-piston 16 is in its position of rest, and closes when the master-piston 16 begins to be driven inwards.

The master-cylinder 10 further comprises a pressure-coupling station having three bores in line 30, 31 and 32. The axis of the bores 30, 31 and 32 is parallel to that of the bores 13, 14 and 15. In the bores 30, 31 and 32 is engaged a single plunger 33 comprising three pistons 34, 35 and 36, engaged respectively in the bores 30, 31 and 32.

To the rear of the piston 34 is arranged a first primary pressure chamber 37. Between the pistons 34 and 35 is formed a second primary pressure chamber 38. Between the pistons 35 and 36 is formed a space 39 which communicates continuously by a conduit 40 with the tank 25. To the front of the piston 36 is arranged a secondary chamber 41.

The first primary pressure chamber 37 is connected by a passage 42 with the first primary thrust chamber 22. The second primary pressure chamber 38 is connected by a passage 43 with the second primary thrust chamber 23. The secondary pressure chamber 41 is connected by a passage 44 with the secondary thrust chamber 24.

The left-hand front brake 11 has a hydraulic actuating chamber 50 and a hydraulic reaction chamber 51. The pressure of this latter depends essentially on the actual movement of the wheel during braking, and is greater on forward running (direction of the arrow F) than on reverse running (direction opposite to that of the arrow F). The front right-hand brake 11' has a similar construction and there can be seen at 50' its actuating chamber and at 51' its reaction chamber. The rear brakes 12 and 12' have actuating chambers 52 and 52'.

The master-piston 16 of the master-cylinder 10 drives in a partitioned manner from the three chambers 22, 23 and 24, three volumes of oil into three independent conduits 53, 53' and 54.

The first conduit 53 is coupled to the actuating chamber 50 of the front left-hand brake 11 and is in continuous communication by 37, 42 with the chamber 22.

The second conduit 53' is connected to the actuating chamber 50' of the front right-hand brake 11' and communicates continuously by 38, 43 with the chamber 23.

The master-cylinder 10 is arranged in such manner that equal volumes are driven from the chambers 22 and 23 into the conduits 53 and 53'.

The third conduit 54 is connected to the actuating chambers 52 and 52' of the rear brakes 12 and 12" and communicates continuously by 41, 44 with the chamber 24.

The reaction chambers 51 and 51' of the front brakes 11 and 11' are connected to each other at 55 and to a fourth conduit 56. This latter is connected to the master-cylinder 10 through the intermediary of an automatic reversing device, formed by the piston 36 of the single plunger 33. The plunger 33 is mounted between a position of forward running and of rest (as shown in FIG. 2) in which the fourth conduit 56 communicates by 41 with the third conduit 54, and a reverse running position (displaced towards the left of FIG. 2 with respect to the position shown in this figure) in which the fourth conduit 56 communicates by 39, 40 with the tank 25.

As can be seen more particularly from FIG. 2, the conduit 56 opens into the bore 32 by means of a narrow orifice 57 which co-operates with a sealing joint 58 mounted on the piston 36 of the single plunger 33. It will be understood that when the joint 58 is on the right-hand side of the orifice 57 (the position of FIG. 2), the fourth conduit 56 communicates by 41 with the third conduit 54 while, when the joint 58 is on the left-hand side of the orifice 57, the fourth conduit 56 communicates by 39, 40, with the tank 25.

The single plunger 33 is responsive to a comparison between the pressure at 41 and the sum of the pressures at 37 and 38, and tends to be returned by a spring 59 to the position of rest of FIG. 2, in which the plunger 33 is in abutment against a shoulder 60.

In the example shown in FIG. 1, the front brakes 11 and 11' are of the drum type with jaws. The two jaws 61 and 62 are interconnected by an arm 63 and are associated on the one hand with a centering device comprising a fixed support 64 and a spring 65, and on the other hand with a general restoring spring 66.

The rear brakes 12 and 12' are also of the drum type with jaws. One of these jaws, the jaw 67, is actuated by the pressure of the chamber 52, while the other jaw 68 comes into abutment support at 69. The two jaws 67 and 68 are interconnected at 70 and are associated with a return spring 71.

During the course of braking on forward running (direction of the arrows F), volumes of oil are expelled from the master-cylinder 10 through the conduits 53 and 53' into the chambers 50 and 50' of the front brakes 11 and 11'. The two two jaws 61 and 62 are actuated by the pressure of the chamber 50 so as to come into contact with the drum. The assembly formed by the two jaws, the interconnecting arm and the two pistons, driven in the same direction and against the action of the spring 65, develops a pressure in the chamber 51.

In each front brake there is therefore a double movement of expansion and winding of the jaws 61 and 62. The rotation of the drum in the direction of the arrow F maintains a braking reaction which develops a high pressure in the secondary chambers 51 and 51'. This high pressure is the same in both chambers 51 and 51' since they are in communication by 55.

The secondary pressure in the secondary pressure chamber 41 of the master-cylinder 10 is substantially higher than the pressures in the primary pressure chambers 37 and 38. The plunger 33 is held pushed back towards the right of FIG. 2 in abutment against the shoulder 60, and the joint 58 is held in position to the right of the orifice 57. The two primary pressures are independent of each other.

The secondary pressure transmitted through the conduit 56 passes freely through the orifice 57, the chamber 41 and the conduit 54, to the rear brakes 12 and 12' which are then engaged.

In the case of braking on reverse running (opposite direction of rotation to the arrow F) the reactions of the jaws 61 and 62 of the front brakes 11 and 11' are reversed. The jaw 62 is applied against the fixed support 64 and acts as a jaw under compression. The jaw 61 is supported against the arm 63 and acts as a jaw under tension under the action of the pressure at 50.

The secondary pressure becomes small or zero, or even possibly the secondary chambers 51 and 51' may be momentarily put under depression. The primary pressures at 37 and 38 have a preponderant action on the single plunger 33. The latter moves towards the left of FIG. 2 against the action of the spring 59, and puts the orifice 57 into communication by 39, 40 with the tank 25.

Oil is driven into the conduit 54 by the effect of reduction of volume of the chambers 24 and 41. The rear brakes 12 and 12' which are supplied through this conduit 54, become operative.

It will be appreciated that the arrangement according to the invention provides reliable operation under all circumstances. In particular, the combination of a single plunger 33 with the small orifice 57 makes it possible, during braking on forward running, if the pressure in one of the chambers 50 and 50', for example the chamber 50, becomes preponderant with respect to the pressure at 56, for example in consequence of bad adhesion on the ground of one side of the road (the left-hand side in the present case), to prevent any inopportune displacement of the plunger 33 towards the left of FIG. 2. In fact, in such an eventuality, the single plunger 33 would be held back by the suction effect developed by the liquid which is located in the chamber 38 and the pressure of which is comparatively low if the adhesion on the right-hand side of the road is normal. The plunger 33 thus remains in the right-hand position of FIG. 2, which is suitable for appropriate braking on forward running.

It will of course be understood that the invention is not limited to the form of embodiment described and illustrated, but includes all its alternative forms.

What I claim is:

1. A hydraulic brake installation, especially for automobile vehicles, in which each of the brakes of a first axle, for example the front axle, has a hydraulic actuating chamber and a hydraulic reaction chamber, while each of the brakes of a second axle, for example the rear axle, has a hydraulic actuating chamber, a master-cylinder having a master-piston which drives in a partitioned manner three volumes of oil respectively into three independent conduits: a first and a second conduit respectively coupled to the two actuating chambers of the brakes of the first axle and a third conduit coupled to the actuating chambers of the brakes of the second axle, the reaction chambers of the brakes of the first axle each having a pressure which, during the course of braking, results from the reaction of the braking torque applied to the corresponding wheel, and which is higher on forward running than on reverse running, said reaction chambers being coupled to each other, and to a fourth conduit connected to the master-cylinder through the intermediary of automatic reversing means movably mounted between two positions, a forward-running position in which the fourth conduit communicates with the third conduit, and a reverse-running position, in which the fourth conduit communicates with a tank, said reversing means comprising a plunger device which in one direction is subjected to the action of a spring and to the action of the pressure existing in said third conduit and which, in the other direction, is subjected to the sum of the actions of the pressures existing respectively in said first and second conduits.

2. A hydraulic brake system as claimed in claim 1, in which said master-cylinder further comprises a pressure-coupling portion having three bores in line, said plunger device comprising a single plunger member comprising three pistons respectively engaged in said bores.

3. A hydraulic brake system as claimed in claim 1, in which said master-cylinder comprises three stepped bores of different diameters, adapted to receive said master-piston.

4. A hydraulic brake system as claimed in claim 3, in which said master-piston comprises three pistons of decreasing diameters, engaged respectively in said bores, said pistons being adapted to form three primary thrust chambers, one between the first and second pistons, one between the second and third pistons, and one in front of said third piston.

References Cited

UNITED STATES PATENTS

| | | |
|---|---|---|
| 2,732,918 | 1/1956 | Hackworth _____ 188—152 |
| 2,739,448 | 3/1956 | Troy _____ 188—152 X |
| 3,259,214 | 7/1966 | Lepelletier. |
| 3,351,161 | 11/1967 | Lepelletier. |

GEORGE E. A. HALVOSA, *Primary Examiner.*

U.S. Cl. X.R.

60—54.5; 303—6